United States Patent Office 3,132,098
Patented May 5, 1964

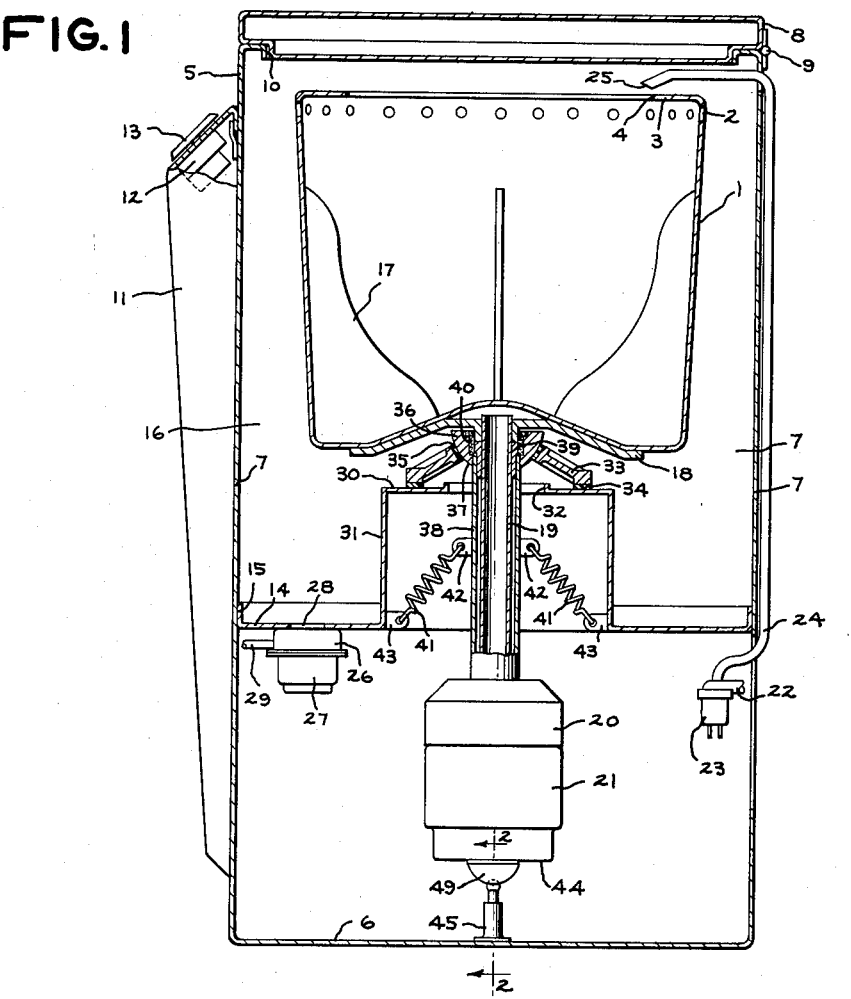

3,132,098
CENTRIFUGING MACHINE HAVING ANTI-PRECESSIONAL DAMPING MEANS
John Bochan, Louisville, Ky., assignor to General Electric Company, a corporation of New York
Filed Feb. 28, 1962, Ser. No. 176,316
5 Claims. (Cl. 210—365)

This invention relates to centrifuging machines, and more particularly to such machines where improved anti-precessional means are provided in cooperation with the vibration isolating system of such machines.

In many machines, particularly washing machines of the type which have a basket centrifuging liquid out of clothes on a vertical axis, it is important that as much vibration be isolated from the outside frame of the machine as possible without, however, permitting any substantial amount of vertical freedom of the moving system. Various suitable means have been provided to achieve this goal (for instance, the systems covered respectively by my Patent 2,987,190, issued on June 6, 1961, and by application Serial No. 63,005, filed on October 17, 1960, by John Bochan and Creighton E. Pool, now Patent 3,026,700, issued March 27, 1962, both assigned to the assignee of the present invention); however, the problem has arisen that in such systems, where vertical freedom is substantially eliminated, there is often a tendency in the system for a precessional motion to occur as a result of the unbalances. This precessional movement is, in effect, a slow gyrational motion of the axis of rotation, of steadily increasing magnitude, which is superimposed on the ordinary unbalance-caused vibrational gyration of the system. In its most severe aspect, the precessional movement can cause damage to the machine and is, thus, a thoroughly unwanted phenomenon.

It is, therefore, an object of my invention to provide anti-precessional means in machinery of the type which has a rotating system which is substantially prevented from vertical motion but is otherwise arranged to have its forces substantially isolated from the supporting frame.

A more specific object of my invention is to provide a relatively simple damping structure immediately below the moving system which cooperates with the moving system to prevent occurrence of the undesired precessional phenomenon.

In one aspect of my invention, I provide a machine in which a moving system, which includes driving means and means rotated at high speed by the driving means, has a smooth substantially flat bottom surface. This moving system is supported on a stationary frame for horizontal vibrational motions and for rocking vibrational motions so as to isolate a substantial amount of the forces of the moving system from the frame; however, the support arrangement permits little or no vertical motion for the system. In cooperation with the foregoing structure, I provide a suitable anti-precessional damping means in which a damping member with a substantially flat upper surface is positioned to engage the flat bottom surface of the moving system. This damping member is mounted on a universal joint so that it may swivel in all directions, and is biased vertically upwardly so as to be forced into damping engagement with the moving system. It has been found that the presence of this structure beneath the moving system is highly effective in preventing precession of the moving system.

The features of my invention which I believe to be novel are set forth with particularity in the appended claims. The invention itself, however, both as to organization and method of operation, together with further objects and advantages thereof, may best be understood by reference to the following detailed description taken in conjunction with the accompanying drawing.

In the drawing, FIGURE 1 is a side elevational view, partly broken away and partly in cross section to show details of a machine, more particularly a vertical axis centrifuging type washing machine, provided with the improved anti-precessional means of my invention; and FIGURE 2 is an enlarged view along line 2—2 in FIGURE 1.

Referring now to FIGURE 1 of the drawing, there is shown therein a machine which, for illustrative purposes and because of the special additional advantages obtained therein, is depicted as a vertical axis centrifuging type washing machine having a clothes basket 1 preferably formed, as shown, as an inverted frustum of a cone. Basket 1 is substantially imperforate except for openings or perforations 2 provided therein at the largest diameter, that is, adjacent the top thereof, the top of the clothes basket being formed as an inwardly extending flange 3 defining a loading and unloading opening 4. Enclosing the basket 1 is a frame in the form of an appearance cabinet 5, which includes a base 6 adapted to be seated on an appropriate floor, vertically extending walls 7, and a lid 8 pivotable on a hinge 9. In closed position, lid 8 covers an opening 10 provided to afford access to the interior of basket 1 so that clothes may be inserted into and removed from the basket when the lid 8 is pivoted to an open position. Secured on the front wall 7 there may be an appropriate control supporting structure 11 on which there is mounted a conventional sequence control mechanism 12 manually presettable by means of a member 13 so as to provide a washing operation. The side walls 7 of cabinet 5 and a member 14, which is continuously secured around its outer edge 15 to the side walls 6, form together a liquid receiving tub 16 within which the basket 1 is positioned.

Within basket 1, suitable means are provided for effecting a circulatory motion of water contained therein in order to effect washing of clothes placed in the basket. In the present case, these means comprise vanes 17 arranged to cause a suitable circulatory motion of water in the basket to effect washing of clothes upon oscillation of basket 1 about a vertical axis. It will, of course, be recognized that a separate agitator device may be provided extending up into the basket 1 as is the case in many commercially available machines, but for simplicity the explanation of the general structure of vanes 17 may be considered as typical.

The basket 1 is rigidly secured through an intermediate supporting flanged member 18 to a shaft 19 formed substantially coaxially with basket 1 and extending downwardly into a driving and transmission structure generally indicated by the numeral 20. In the conventional manner, this structure may include a reversible motor 21: when motor 21 is rotated in one direction, transmission 20 transmits the motor movement to the shaft 19 so as to cause rotation of the basket 1 at high speed for centrifuging purposes; when the motor 21 rotates in the opposite direction the transmission 20 causes it to provide an oscillatory motion to the shaft 19—this oscillates the basket back and forth to cause vanes 17 to circulate water therein in the appropriate manner for washing purposes. Transmissions for effecting rotary motion of the shaft in one direction of rotation of the motor and an oscillatory motion of the shaft in the opposite direction of the motor are well known in the art, and therefore the transmission is not described in detail herein.

Conventional means for introducing water into the machine are provided. These are schematically shown in the present case by an inlet conduit 22 leading into a valve 23 which controls flow of liquid through a conduit 24 having an outlet 25 discharging into the basket 1. Of course, both hot and cold water may be brought into the machine in this manner so that hot, cold or warm (mixed) water may be used for any given operation. In order to discharge liquid from the machine, a suitable pump 26, which may be driven by any desired means such as the separate motor 27, is secured to member 14 so as to have its inlet 28 communicating with the lowest point in tub 16. The pump 26 is connected through a conduit 29 to an appropriate drain (not shown) so that when removal of the water is desired (as during a centrifuging operation for instance) motor 27 may be energized to run pump 26 which then pumps water from the tub through inlet 28 and then through conduit 29 to drain.

With the structure described thus far, a suitable sequence of operations may be provided in the machine. As one typical cycle, liquid may be introduced by energization of valve 23 for a period appropriate to fill basket 1 to the desired level; then the motor 21 is energized in the direction to cause basket 1 to oscillate back and forth to wash the clothes. After a predetermined period of this washing action, the motor 21 is reversed and the motor 27 is energized to cause, respectively, the basket to rotate at a high centrifuging speed and the pump to remove the liquid from the tub as it passes into the tub through openings 2 as a result of high speed rotation of the basket. Following this extraction operation, a supply of clean liquid may then be introduced into the basket to rinse the clothes as the basket is once again oscillated. Finally, the basket may then be once more rotated at high speed to extract the rinse water and discharge it through openings 2 for removal from the tub by pump 26. All of these operations may be effected automatically in sequence by suitable connections from control 12 to the operating components; the control of the components by a conventional sequence control means is well known in the art and therefore is not further described herein.

Member 14 includes an annular horizontally extending surface 30 which, by virtue of vertically extending portion 31 of member 14, is substantially above the lowest part of tub 16. This, then, shows that, while a substantial amount of splashing may occur at the level of surface 30, the liquid level reached by water standing in the tub will normally remain substantially below surface 30, the capacity of pump 26 being sufficient to prevent the liquid from rising to the level of surface 30 as it is passed out through openings 2 during high speed rotation of basket 1.

The surface 30, as stated, is annular; it includes a central opening 32 provided to accommodate in spaced relation the downwardly extending assembly which includes shaft 19 passing from the basket 1 down to the driving transmission assembly 20. An annular assembly 33 is provided which includes a continuous annular lower surface 34 and a continuous annular upper surface 35. The lower surface 34 is formed so as to be flat and therefore rests on the surface 30 in slidable relation thereto. The amount of friction which is provided between the surfaces 30 and 34 is controlled by the composition of the two surfaces, and thus damping may be provided between these surfaces as desired. The surface 35 is formed as a surface portion of a sphere. Nested within the surface and supported thereby is a member 36. Member 36 has a spherical surface 37 and forms a part of a moving, or suspended, system together with container 1, shaft 19, and assembly 20. In the present case, the member 36 is secured to a downwardly extending sleeve member 38 which supports a bearing 39 within which shaft 19 rotates and on which the flange member 18 is supported. At its lower end, the sleeve 38 provides the support for the assembly 20, thus providing a moving system wherein basket, transmission, and motor are all in line on the axis of rotation of the basket. Since supporting flange member 18 is rotatable at high speed with basket 1, and since member 36 is not so rotated, suitable liquid sealing means such as packing 40 is preferably provided as shown.

Surfaces 35 and 37 are formed as part of a single sphere having its center on the vertical axis of rotation of basket 1, so that in effect part 36 may tilt, or rock, in any direction within the supporting assembly 33 by virtue of sliding motion occurring between surfaces 35 and 37. In the same manner as the surfaces 34 and 30, the surfaces 35 and 37 may be formed of appropriate material to provide damping as desired. The precise structure of this type of apparatus is fully described and claimed in the aforesaid Bochan and Pool application and will therefore not be described in detail herein, inasmuch as the concept behind its operation does not form a part of this invention. Suffice it to say that the moving system, as defined above, is free to move horizontally and is also free to rock, but is not free to move vertically.

In order to provide the position shown under normal circumstances when the machine is at rest, relatively light coil springs 41 may be provided connected at their inner ends to lugs 42 extending from sleeve 38 and at their outer ends to lugs 43 which form a part of member 14. Since any horizontal movement of assembly 33 away from the position shown, that is, away from a centered position within cabinet 5, will cause compression of one of the springs 41 and extension of another one of the springs, the springs tend to return assembly 33 (and the moving system) to a horizontally centered position.

In effect then, when the drive system 20 is causing high speed rotation of basket 1 through shaft 19, horizontal unbalance movement occurs as a result of surface 34 of assembly 33 sliding on surface 30, with the two sliding surfaces also providing some damping. Also, tilting, or rocking, movement in all directions occurs as a result of the member 36 being supported within assembly 33 with surfaces 37 and 35 providing additional damping. The combination of the two supporting arrangements provides, in effect, five degrees of freedom for the basket relative to the cabinet 5 (two horizontal degrees of freedom, two degrees of freedom to pivot about horizontal axes, and one degree of freedom to pivot about a vertical axis). This leaves only the vertical direction of movement in which no freedom is provided. This type of structure has been found to be highly effective in eliminating the major part of the vibration-caused forces from frame 5 while at the same time providing the highly desirable attribute for a washing machine that the clothes container remains at the same height. This is important for various reasons, among them being the relatively limited amount of vertical space which is available for such machines, and further, the fact that precise vertical positioning is desirable in many commercially provided machines of this type to help prevent clothes from passing out of the inner basket and into the outer tub.

However, when no freedom in the vertical direction is provided, it has been found that such machines have an increased tendency toward the precessional type of movement previously referred to, and it is toward the prevention of this phenomenon that the structure referred to hereinafter is provided.

The bottom of the moving system is formed as a substantially flat surface 44 which extends in a generally horizontal plane when the moving system is at rest. Supported on the base 6 is a tubular member 45 rigidly connected to base 6 by any suitable means, such as welding. Within the tubular member 45 there is telescoped a second tubular member 46 at the top of which a sphere 47 is positioned as shown so that, in effect, the sphere is trapped at the top of the tube 46. Sphere 47 at its top part fits in a mating concavity 48 formed in a member 49 having a flat upper surface 50 which may be formed of a conventional suitable damping material. Surface 50 is substantially flat, and faces upwardly so as to lie against the downwardly facing flat surface 44. To insure continuous engagement of these two surfaces a spring 51 is provided within tubular member 45. The spring 51 forces tube 46 and ball 47 upwardly so as to exert a vertically upward biasing force on member 49 and thus maintain appropriate engagement between surfaces 44 and 50.

It can be seen that the tube 46 and ball 47 form, for the member 49, a universal joint which permits swiveling of member 49 in all directions. Thus, regardless of the amount of rocking of the moving system the member 49 will swivel to maintain the flat engagement between the surfaces 44 and 50. Also, of course, for simple horizontal motion of the moving system the two flat surfaces 44 and 50 will simply slide relative to each other in a horizontal plane. Thus, for the type of system shown, continued engagement of surface 50 of the damping member 49 with the bottom surface 44 of the moving system is insured. It has been found that this effects positive prevention of precession in vibrational oscillating systems wherein several degrees of freedom are provided but freedom of movement along the vertical axis is not permitted. Thus, the structure shown in FIGURE 1 and amplified in FIGURE 2 provides a highly effective, simple, and desirable answer to the problem of preventing precession in the type of system described.

It will be recognized that the precise system shown is not the only one wherein the structure may be provided in that other systems wherein several degrees of freedom are provided, but not freedom of movement along the vertical axis, my damping structure is equally effective. The aforementioned Bochan patent constitutes an example of one such other type of system.

Thus, while in accordance with the patent statutes I have described what at present is considered to be the preferred embodiment of my invention, it will be obvious to those skilled in the art that various changes and modifications may be made therein without departing from the invention, and I therefore aim in the appended claims to cover all such changes and modifications as fall within the true spirit and scope of my invention.

What I claim as new and desire to secure by Letters Patent of the United States is:

1. A machine having driving means comprising:
   (a) a moving system including means rotated at high speed by said driving means, said moving system including a smooth substantially flat bottom surface;
   (b) a stationary frame;
   (c) means arranged to support said moving system on said frame for horizontal vibrational motion and rocking vibrational motion; and
   (d) anti-precessional damping means for said moving system therebelow comprising a damping member having a smooth substantially flat upper surface in sliding relation to said bottom surface of said moving system, said damping member being vertically movable, horizontally stationary universal joint means engaging said damping member so as to permit swiveling thereof, and means biasing said damping member vertically upward and maintaining said damping member against said bottom surface of said moving system.

2. The apparatus defined in claim 1 wherein said machine is a laundry machine, said driven means comprising means for laundering clothes including a clothes basket, and said driving means comprising an electric motor secured to said basket for rotating said basket at a centrifuging speed.

3. The apparatus defined in claim 2 wherein said basket and said motor are substantially coaxial with each other to provide a balanced in-line structure.

4. A washing machine comprising:
   (a) a moving system including a rotatable clothes basket and a drive motor connected to said basket for rotating said basket at a centrifuging speed, said moving system including a smooth substantially flat bottom surface;
   (b) a stationary frame including a base;
   (c) means arranged to support said moving system on said frame for horizontal vibrational motion and rocking vibrational motion; and
   (d) anti-precessional damping means for said moving system therebelow comprising a damping member having a smooth substantially flat upper surface and a spherical concavity in its lower surface, said damping member being in sliding relation to said bottom surface of said moving system, said damping member being vertically movable, horizontally stationary means including a ball rotatably mounted at the top of said horizontally stationary means, said ball fitting within said concavity thereby to permit swiveling of said damping member on said ball, and means biasing said damping member vertically upward and maintaining said damping member against said bottom surface of said moving system.

5. The apparatus defined in claim 4 wherein said biasing means acts on said ball whereby the force biasing said damping member vertically upward is exerted through said ball.

References Cited in the file of this patent

UNITED STATES PATENTS

| | | |
|---|---|---|
| 1,735,523 | Barrett | Nov. 12, 1929 |
| 2,296,259 | Breckenridge | Sept. 22, 1942 |
| 2,346,158 | Dyer | Apr. 11, 1944 |
| 2,375,635 | Dyer | May 8, 1945 |
| 2,381,894 | Ferris | Aug. 14, 1945 |
| 2,667,269 | Reitz et al. | Jan. 26, 1954 |
| 2,969,172 | Hutt | Jan. 24, 1961 |
| 2,987,190 | Bochan | June 6, 1961 |
| 3,026,700 | Bochan et al. | Mar. 27, 1962 |